March 5, 1963  G. C. HUNT  3,079,908
MULTIPLE BLADE POWER HACKSAW
Filed Nov. 22, 1960  3 Sheets-Sheet 2
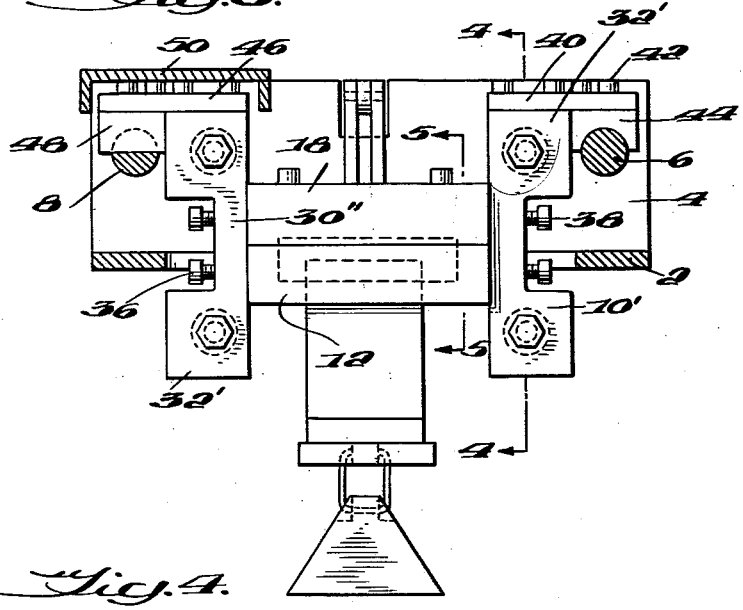
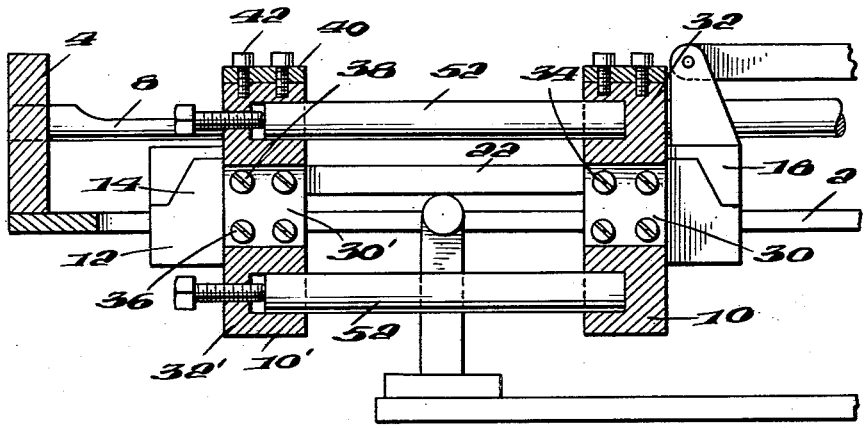
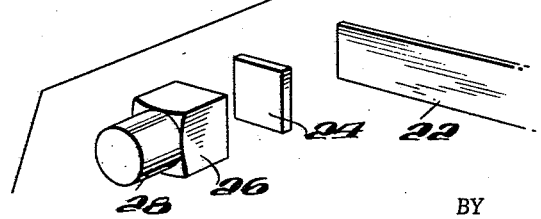
INVENTOR
Grover C. Hunt
BY Bailey, Stephens & Huettig
ATTORNEYS

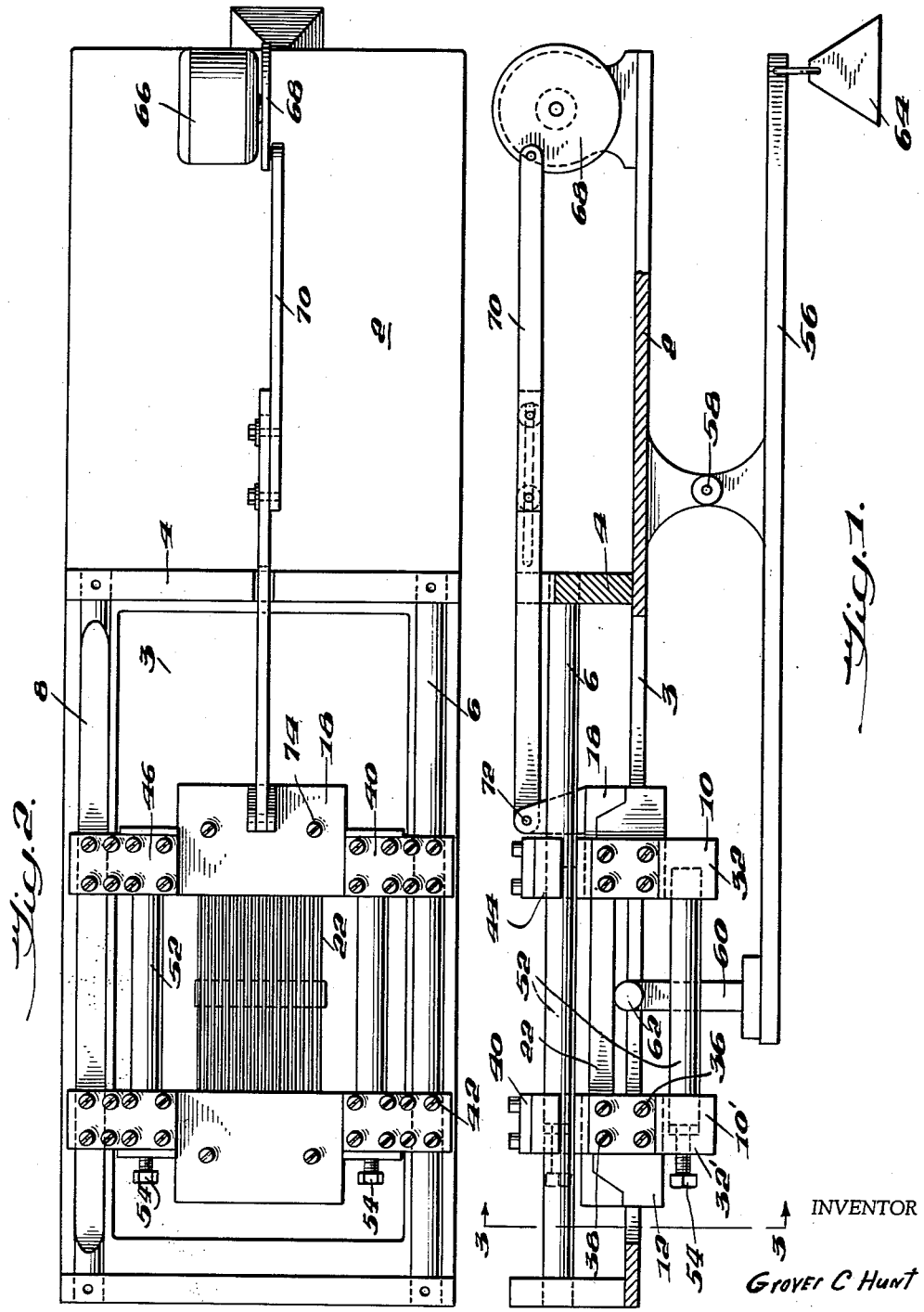

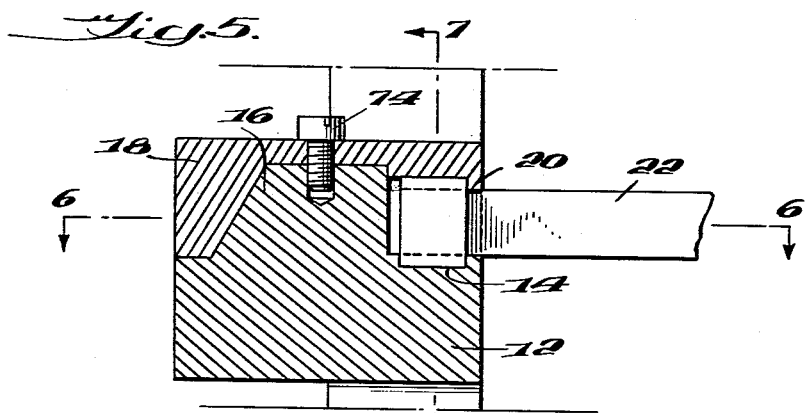
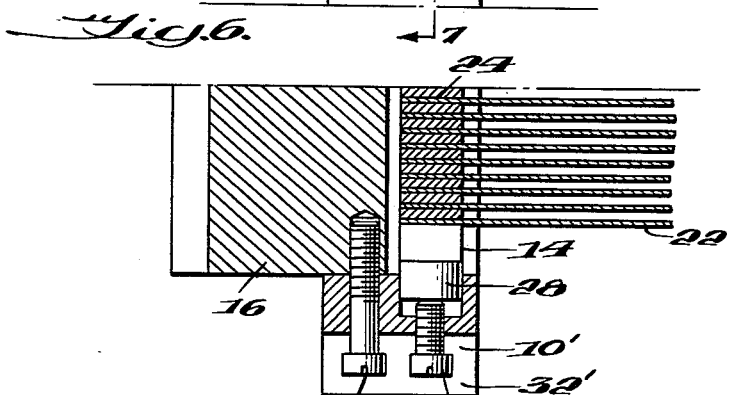
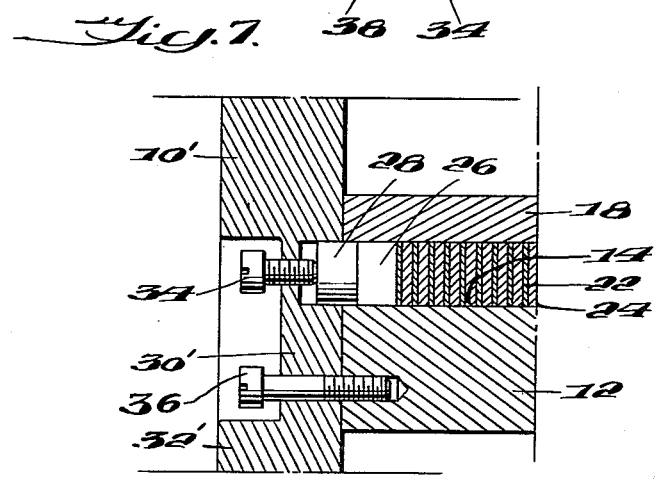

3,079,908
MULTIPLE BLADE POWER HACKSAW
Grover C. Hunt, Carlisle, Pa., assignor, by mesne assignments, to Norton Company, Worcester, Mass., a corporation of Massachusetts
Filed Nov. 22, 1960, Ser. No. 70,997
16 Claims. (Cl. 125—17)

The invention relates to a multiple blade power hacksaw, and particularly to a saw for the purpose of cutting hard materials, such as quartz, silicon, germanium and gem stones.

The primary object of the invention is to provide a saw of this type which will cut materials and especially hard materials into very thin wafers. The cutting of such wafers has become particularly important in connection with certain types of electronic equipment.

Another object of the invention is to provide a saw which will cut more wafers from one piece of material than devices heretofore known. Since these materials are quite expensive, the saving thus acocmplished is substantial.

Another object of the invention is to provide a saw device which is gentle on the flake being cut, so that chipping or breaking of the material is substantially reduced.

A further object of the invention is to provide a saw which will not lead or lead off track, by reason of the rigid securing of the blades at both ends, which is not accomplished in other saws now used for this purpose.

An additional object of the invention is to provide a machine which is free from vapor fumes, which are present in the devices now being used for this purpose.

Still another object of the invention is to provide a device of quite simple construction, so that a number of machines can be operated by one operator at the same time.

In general, the invention consists of the use of two heavy steel blocks between which the saw blades are stretched. The saws are mounted in such a way that they can be stretched to substantially the same tension, so that all of them will be certain to be taut enough to do the sawing properly. This is accomplished by mounting each saw blade, at least at one end, between frictional gripping members, and providing means for stretching the blocks apart, so that the more taut blades will slide somewhat in the frictional holding members while the less taut blades are being stretched.

Further objects and advantages of the invention will appear more fully from the following description, especially when taken in conjunction with the accompanying drawings which form a part thereof.

In the drawings:

FIG. 1 shows in side elevation a multiple saw embodying the invention;

FIG. 2 is a top plan view thereof;

FIG. 3 is a cross-section on line 3—3 of FIG. 1;

FIG. 4 is a cross-section on the line 4—4 of FIG. 3;

FIG. 5 is a cross-section on the line 5—5 of FIG. 3;

FIGS. 6 and 7 are cross-sections on the lines 6—6 and 7—7 respectively of FIG. 5; and FIG. 8 is an exploded perspective view of certain of the parts.

As shown in the drawings, the saw is mounted on a table 2 having a central opening 3, and upright members 4 at each end of the opening.

Between the upright members 4 are secured a round guide member 6 on one side and a guide member 8 on the other side having a flat upper surface.

The saw holding frame includes at each corner upright frame members 10, 10'. These frame members hold the saw holding blocks in a manner to be described below.

The saw holding blocks (see FIGS. 5 to 7) include a lower block 12 having a transverse groove 14 in its upper face and an upward projection 16. The upper block 18 has a groove in its lower face which fits over the projection 16, so as to lock the blocks against movement with respect to each other longitudinally, and a downward projection 20, spaced from the upper face of the lower block 12 by a distance at least equal to the width of a saw blade 22.

Bolts 36 are threadedly engaged in the ends of the lower blocks 16 and bolts 38 in the ends of the upper blocks 18 so as to hold these blocks rigid with the frame members 10, 10'.

The saw blades 22 are frictionally held at their ends between spacers 24 which fit into the grooves 14 and behind the downward projections 20 of the upper blocks. Slidable at each end in each groove is a pressure member consisting of a round portion 28 and a square portion 26 which engages in the groove. Bolts 34 are threaded in the narrow central sections 30, 30', of the frame members 10, 10', which have enlarged upper and lower portions 32, 32'. It is obvious that tightening of bolts 34 on each side will compress the spacers 24 against the blades and thereby will exert a frictional holding force on the ends of the blades.

Mounted on the frame members 10, 10' at the right hand side (FIG. 3) are plates 40, which are secured by bolts 42 to the upper enlarged leads 32, 32' of the frame members, and which by similar bolts 42 carry bronze bearing members 44 which fit slidably on the rod 6.

At the other side, to the upper enlarged heads 32, 32' are secured plates 46 which carry bronze blocks 48 sliding on the upper face of guide rod 8.

By shimming one or the other of the bearing members 44 towards or away from the frame members 10, 10', it is possible to adjust the position of the whole saw frame, so as to ensure that the saws run exactly parallel to their direction of movement and not at an angle thereto.

A shield 50 is secured on the parts 46, for the purpose of protecting the rod 8 from any grit which might be fed by hand across it to the blades 22.

Rods 52 are secured at one end within sockets in the enlarged portions 32 of the frame members 10. At the other end, they fit slidably into openings in the heads 32' of the frame members 10'. Bolts 54 threaded in the heads 32' engage the ends of rods 52. It will be obvious that tightening of these bolts will tend to push the frame members 10, 10' apart, so as to stretch the saw blades 22 carried thereby.

In order to hold the piece to be cut, a bar 56 is pivoted at 58 on the lower side of the table and holds a carrier 60 to which a workpiece 62, such as a quartz rod, can be secured by a suitable adhesive. A weight 64 at the other end, which of course may be adjustable, holds the piece to be cut in engagement with the blades.

The whole frame is reciprocated by a motor 66 driving a crank disc 68 which reciprocates a connecting rod 70 connected at 72 to one of the upper blocks 18.

The blocks themselves, when the saw blades are assembled, are held together by bolts 74.

In assembling the frame, bolts 54 are loosened so that the blocks can be moved towards one another. The saw blades (which may be merely thin strips of steel) are assembled alternately with the spacers in the grooves 14. Bolts 34 are now tightened somewhat, although not fully. Bolts 54 are now tightened, so as to spread the blocks, or end frame members, apart. While this is done, the less taut blades will be stretched, while the more taut blades will slip somewhat between the blocks. Bolts 34 are now tightened fully and bolts 54 are further tightened until all the blades are sufficiently taut. In this way, the blades will all be of almost exactly the same tautness, and neither so slack as to be likely to wobble and cut unevenly or so taut as to be likely to snap.

In operation, driving of the motor will cause reciprocation of the frame, and the supplying of grit of a suitable type and size to the blades 22 will cause cutting of the workpiece 62. The wafers thus obtained are quite close to exactness both as to the planeness and as to the parallelism of their surfaces, sufficiently so that they can be brought to exactness without excessive lapping.

While I have described herein some embodiments of my invention, I wish it to be understood that I do not intend to limit myself thereby except within the scope of the claims hereto or hereinafter appended.

I claim:

1. A frame for a multiple blade reciprocating saw comprising a pair of end frame members having means therein for holding the end portions of saws blades, the holding means in at least one of said end frame members comprising transverse clamping means for holding the end portions of the saw blades longitudinally of the frame by friction only, and longitudinal frame members having means associated therewith and operatively connected to the end frame members for forcing the end frame members apart so as to stretch to substantially equal tautness saw blades held frictionally by said holding means.

2. A frame for a multiple blade reciprocating saw comprising a pair of end frame members each having transverse clamping means therein for holding the end portions of the saw blade longitudinally of the frame by friction only, and longitudinal frame members having means associated therewith and operatively connected to the end frame members for forcing the end frame members apart so as to stretch to substantially equal tautness saw blades held frictionally by said holding means.

3. A frame for a multiple blade reciprocating saw comprising a pair of end frame members having means therein for holding the end portions of saw blades, the holding means in at least one of said end frame members comprising a plurality of spacers spaced transversely of the frame for frictionally engaging the end portions of saw blades therebetween, the end frame member including means engaging the spacers to prevent movement thereof longitudinally of the frame, means carried by the frame for pressing said spacers into frictional engagement with the ends of saw blades engaged therebetween, and longitudinal frame members having means associated therewith and operatively connected to the end frame members for forcing the end frame members apart so as to stretch to substantially equal tautness saw blades held frictionally by said holding means.

4. A frame as claimed in claim 3 in which said end frame member is composed of two interlocked blocks, said spacer engaging means including a groove in one of the blocks in which the spacers fit and a facing overhanging portion on the other block engaging the edges of the spacers, the overhanging portion of the second block being spaced from the first block to provide a space through which saw blades engaged between the spacers can extend.

5. A frame as claimed in claim 4 in which the spacer pressing means includes at least one follower in the end of the groove and a bolt threaded in the frame and engaging said follower.

6. A frame as claimed in claim 3 in which the spacer pressing means includes at least one bolt threaded in the frame.

7. A frame for a multiple blade reciprocating saw comprising four corner frame members, two bars extending longitudinally of the frame between the end portions of each pair of corner frame members at each side of the frame, said bars being secured in one of the corner frame members of each pair and being slidable in the other member of such pair, bolts threaded in such other member and engageable with the ends of the bars for exerting a force thereon tending to force the corner frame members apart longitudinally of the frame, end frame members secured to each transverse pair of corner frame members intermediate the ends thereof, the end frame members having means therein for holding the end portions of saw blades, the holding means in at least one of said end frame members comprising means for holding the end portion of the saw blades by friction only, whereby tightening of said bolts serves to stretch to substantially equal tautness saw blades held frictionally by said holding means.

8. A frame for a multiple blade reciprocating saw comprising four corner frame members, two bars extending longitudinally of the frame between the end portions of each pair of corner frame members at each side of the frame, said bars being secured in one of the corner frame members of each pair and being slidable in the other member of such pair, bolts threaded in such other member and engageable with the ends of the bars for exerting a force thereon tending to force the corner frame members apart longitudinally of the frame, end frame members secured to each transverse pair of corner frame members intermediate the ends thereof, the end frame members having means therein for holding the end portions of saw blades, the holding means in at least one of said end frame members comprising a plurality of spacers spaced transversely of the frame for frictionally engaging the end portions of saw blades therebetween, the end frame member including means engaging the spacers to prevent movement thereof longitudinally of the frame, and means carried by the corner frame members for pressing said spacers into frictional engagement with the ends of saw blades engaged therebetween, whereby tightening of said bolts serves to stretch to substantially equal tautness saw blades held frictionally by said holding means.

9. A frame as claimed in claim 8 in which said end frame member is composed of two interlocked blocks, said spacer engaging means including a groove in one of the blocks in which the spacers fit and a facing overhanging portion on the other block engaging the edges of the spacers, the overhanging portion of the second block being spaced from the first block to provide a space through which saw blades engaged between the spacers can extend.

10. A frame as claimed in claim 9 in which the spacer pressing means includes at least one follower in the end of the groove and a bolt threaded in the corner frame member and engaging said follower.

11. A saw for cutting thin wafers of material comprising a frame including a pair of end frame members having means therein for holding the end portions of saw blades, the holding means in at least one of said end frame members comprising transverse clamping means for holding the end portions of the saw blades longitudinally of the frame by friction only, a plurality of saw blades engaged by said holding means and extending longitudinally of the frame parallel to one another, the frame having longitudinal frame members having means associated therewith and operatively connected to the end frame members for forcing the end frame members apart so as to stretch to substantially equal tautness all said saw blades, means to guide the frame for longitudinal movement, and means to impart longitudinal movement to the frame.

12. In a saw as claimed in claim 11, a bar pivoted beneath the guiding means, a carrier for a workpiece mounted on the bar below the saw blades, and means to exert a pressure on the lever to urge the workpiece against the blades.

13. A method for uniformly tensioning a given plurality of saw blades in a given elongated frame comprising supporting the respective ends of the given plurality of saw blades and spacers interposed therebetween at the opposite ends of the given elongated frame, lightly clamping and thereby constraining the ends of the given plurality of saw blades and spacers interposed therebetween adjacent at least one end of the given elongated frame to establish a frictional relationship therebetween, lightly tensioning the given plurality of saw blades by longitudinal relative displacement of the opposite ends of the given elongated frame sufficiently to effect longitudinal displacement of the frictionally constrained ends of more heavily loaded individual saw blades relative to the frictionally constrained ends of more lightly loaded individual saw blades in order to equalize the tension loading on all of the respective saw blades, fully clamping and thereby mutually immobilizing at least one end of the given plurality of saw blades and spacers interposed therebetween, and more heavily tensioning the given plurality of saw blades by further longitudinal relative displacement of the opposite ends of the given elongated frame.

14. A method for uniformly tensioning a given plurality of saw blades in a given elongated frame comprising supporting the respective ends of the given plurality of saw blades and cooperating spacers in supporting means at the opposite ends of the given elongated frame, relatively lightly clamping the respective ends of the given plurality of saw blades and adjoining spacers to establish a frictional relationship therebetween, tensioning the given plurality of saw blades by longitudinal relative displacement of the respective supporting means for the respective ends thereof sufficiently to effect longitudinal displacement of more heavily loaded individual saw blades relative to more lightly loaded individual saw blades in order to equalize the tension loading on all of the respective saw blades, relatively heavily clamping the respective ends of the given plurality of saw blades and cooperating spacers to secure the ends of blades and adjacent spacers against relative displacement, and further tensioning the given plurality of saw blades by further longitudinal relative displacement of the respective supporting means for the respective ends thereof.

15. A method for uniformly tensioning a given plurality of saw blades in a given elongated frame comprising supporting the respective ends of the given plurality of saw blades and intervening spacers in supporting means at the opposite ends of the given elongated frame, relatively lightly clamping the respective ends of the given plurality of saw blades and intervening spacers to establish a frictional relationship therebetween, relatively lightly tensioning the given plurality of saw blades by longitudinal relative displacement of the respective supporting means for the respective ends thereof sufficiently to effect longitudinal displacement of more heavily loaded individual saw blades relative to more lightly loaded individual saw blades to equalize the tension loading on all of the respective saw blades, relatively heavily clamping the respective ends of the given plurality of saw blades and intervening spacers sufficiently to secure the given plurality of saw blades against longitudinal displacement relative to intervening spacers, and relatively heavily tensioning the given plurality of saw blades by further longitudinal relative displacement of the respective supporting means for the respective ends thereof.

16. A device as described in claim 1, wherein said longitudinal frame members are fixed longitudinally relative to one of said end frame members and wherein the means associated with said longitudinal frame members for forcing the end frame members apart includes saw blade tensioning means adjustably interconnecting said longitudinal frame members and the other said end frame member and operable to displace said other end frame member relative to said longitudinal frame members so as to stretch to substantially equal tautness saw blades held frictionally by said holding means.

References Cited in the file of this patent

UNITED STATES PATENTS

| | | |
|---|---|---|
| 2,774,194 | Thatcher | Dec. 18, 1956 |
| 2,942,383 | Brown | June 28, 1960 |
| 3,031,804 | Thatcher et al. | May 1, 1962 |

FOREIGN PATENTS

| | | |
|---|---|---|
| 653,099 | France | Mar. 16, 1929 |